Nov. 22, 1955     W. N. KAISER     2,724,263
APPARATUS FOR TESTING CREAM
Filed May 2, 1952
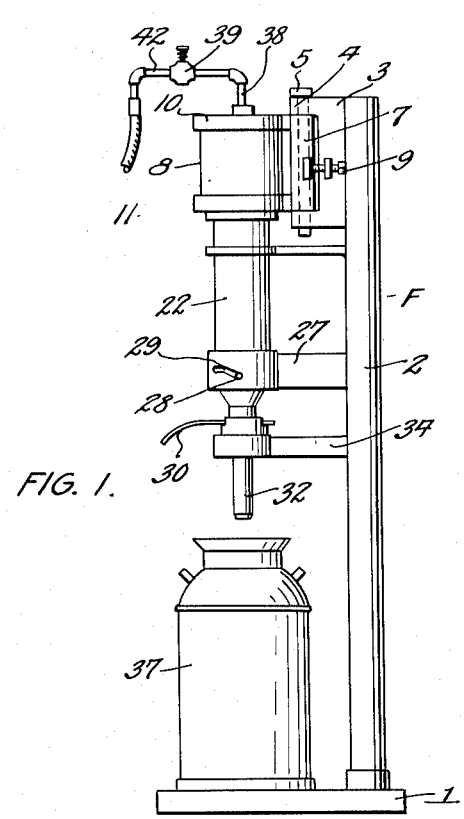
INVENTOR
Walter N. Kaiser
BY W. S. McDowell
ATTORNEY

2,724,263

APPARATUS FOR TESTING CREAM

Walter N. Kaiser, Columbus, Ohio

Application May 2, 1952, Serial No. 285,755

9 Claims. (Cl. 73—61)

This invention relates to apparatus for determining the presence of foreign solids in liquids. In one of its specific fields of use, the invention is employed in testing specimens of cream obtained from cows' milk in a manner facilitating the making of grade determinations on the part of the cream based on the relative presence or absence of foreign solids in the cream.

Commercial dairies normally receive shipments of cream originating from many different dairy farms. Before any one of such cream shipments can be mixed with cream obtained from other sources, it is necessary or desirable to test each individual shipment to ascertain its relative cleanliness and the presence or absence of contaminating solids which the same may contain. If such tests disclose the cream to be clean and relatively free from foreign substances, it is usually classified as a grade A product and requires but little additional processing for commercial sale as cream of top quality. On the other hand, if the test reveals in the cream the presence of foreign solids or contaminants, the cream is given a class B grading, which necessitates that it be segregated from the class A cream and subjected to considerable additional processing in the commercial dairy before it can be used or sold for employment in certain restricted capacities.

The apparatus for sample testing such cream as now generally used in commercial dairies is characterized by the fact that it is slow and laborious to operate and the results obtained therefrom are uncertain and subject to frequent error. Accordingly, the present invention aims to provide improved apparatus for conducting the tests above indicated, and wherein the construction of the apparatus is such that the operator may quickly and positively detect the presence of sediment or undesired foreign solids in a readily executed and reliable manner.

For a further understanding of the invention, reference is to be had to the following description and the accompanying drawing, wherein:

Fig. 1 is a side elevational view of a sediment testing machine formed in accordance with the present invention;

Fig. 2 is a vertical sectional view on a somewhat enlarged scale taken through the machine;

Fig. 3 is a horizontal sectional view, the plane of the figure being indicated by the line 3—3 of Fig. 2;

Fig. 4 is a similar view on the line 4—4 of Fig. 2;

Fig. 5 is a detail front elevational view disclosing the discharge end of the cream-holding receptacle and its associated discharge nozzle;

Fig. 6 is a detail vertical sectional view disclosing the construction of the manually operated control valve employed in admitting fluid under pressure into the piston cylinders of the machine.

The apparatus for sample testing cream in accordance with the present invention comprises a frame having mounted on the upper end thereof for horizontal turning movement a pressure cylinder, the latter being provided with a chamber containing a spring-biased sliding piston. This piston is formed to include spaced upper and lower heads which are united by a stem in which a restricted open-ended passageway is provided. Fluid pressure is admitted into the piston chamber by way of a pipe line containing a normally closed manually operated valve. When fluid pressure is established in the cylinder, the piston therein moves downwardly, bringing the lower head thereof into seating and clamping engagement with the open upper end of a stationarily supported receptacle arranged below the cylinder and in which is adapted to receive a controlled volume of the cream sample to be tested. Before such operation, however, the pressure cylinder is swung on its supporting frame so that it is brought into operating position above and in vertical registry with the open top of the receptacle in which the cream sample is placed.

The bottom of the receptacle is provided with a restricted outlet fitting which is adapted to register with and to be disposed immediately above a perforated seat formed in the top of a frame-supported stationary filter head. Guide means are provided between the perforated seat of said filter head and the discharge outlet of the receptacle to provide for the positioning therebetween of a ribbon of filter paper or the like.

With the parts of the machine in vertical longitudinal registration, fluid pressure is admitted into the fluid cylinder, forcing the pistons contained therein downwardly against spring pressure, and bringing the lower part of the piston into sealing contact with the open upper end of the cream-holding receptacle. The piston actuating fluid not only forces the piston downwardly but it also flows through the restricted passage formed in the hollow stem of the piston, entering the top of the receptacle, where it acts on the body of cream contained in the receptacle, causing forced expulsion of the cream through the outlet fitting in the lower part of the receptacle, with the resultant passage of the cream through a sediment-collecting filter ribbon confined between the outlet fitting and the stationary perforate head of the frame-supported filter member. When the pressure cylinder is subsequently swung on its supporting frame to an inactive position out of vertical registry with the cream receptacle, the latter may be elevated to permit of the withdrawal of the filter ribbon, so that the solids thereon may be examined and the classification of the cream determined by the nature of the solid contaminants present on the ribbon.

With this general description of my improved cream-testing machine, reference is now to be had to the specific embodiment thereof herein selected for illustration and description. It will be understood at this juncture, however, that the construction of said machine is subject to certain modification or variation within the limits of the invention.

As illustrated, my improved testing machine comprises a frame F, consisting of a base 1 from which arises a rigid upright column or pedestal 2. Carried by the upper end of the pedestal is a stationary yoke-shaped bracket 3 having spaced vertical bearing ears 4, the latter being formed with registering openings for the reception of a headed pin 5. The shank of this pin passes through an elongated opening 6 formed in a lateral pivoting extension 7 of a pressure cylinder 8. The cylinder is thus mounted so that it swings about the vertical axis provided by the pin 5 in a horizontal plane, the extent of oscillation of the cylinder being controllable by means of one or more set screws 9 carried by the brackets 3.

The cylinder 8 includes a top wall 10 and from this wall there depends the tubular body 11 of the cylinder, said body being open at its lower end. Slidably mounted in the cylinder chamber 12 is a piston P. In this instance, the piston comprises an upper head 13 and a lower head 14, the two heads being united by an axial stem 15, through which extends an open-ended passageway 16 of restricted diameter. The upper surface of the upper head 13 has secured thereto, as by means of a nut 17 threaded on the upper end of the stem 15, a cup 18 in the nature of a flexible packing. Also, the lower surface of the lower head 14 has secured thereto a disk 19 of a compressible material. Within the cylinder body there is provided a stationary spider 20 which forms a bearing for the sliding reception of the stem 15. A coil spring 21 surrounds the stem and is positioned between the hub of the spider 20 and the under surface of the upper piston head 13, the spring 21 biasing the piston in an upward direction.

By the employment of fluid pressure, the piston P is adapted to be forced downwardly until the disk 19 thereon contacts with the upper edge of the cream-receiving receptacle 22. Preferably, the latter is of cylindrical formation and is formed with an internal chamber 23 in which is adapted to be placed a measured quantity of cream to be tested. Positioned in the bottom of the receptacle 22 is an outlet fitting 24, the latter being formed with a downwardly converging passageway 25 which terminates at the bottom thereof in a restricted outlet 26. The receptacle is slidably supported at its bottom region in a bracket arm 27 which projects stationarily and outwardly from the column or pedestal 2, the bracket arm allowing vertical movement on the part of the receptacle within restricted limits. In this instance, the fitting 24 is provided, as shown in Fig. 5, with an outwardly and laterally extending stud 28, the latter being received in an inclined slot 29 provided in the bracket arm 27. By grasping the outer end of the stud 28, an operator of the machine may impart partial rotating movement to the receptacle which through the inclined slot 29 effects elevation of the receptacle, and enables the operator to insert or withdraw a filter ribbon shown at 30.

Normally, the ribbon 30, which is formed from filter paper or the like, is positioned on a flat seat provided by the upper end of a perforate filter head or member 31, the latter carrying a liquid discharge tube 32. The head is shouldered as at 33 to rest normally on the upper surface of an arm extension 34 which projects rigidly and outwardly from the column or pedestal 2 below the bracket arms 27. The head 31 in this instance is equipped with a perforate disk 35 with which the under surface of the filter ribbon normally engages. Preferably, the head 31 includes upstanding transversely spaced guide lugs 36, which serve to guide the filter ribbon into and maintain the same in operative registration with its seating disk 35 and the restricted lower end of the outlet fitting 24. The tube 32 is disposed in vertical order, and is adapted to register with the open upper end of a milk can 37 or other receptacle positioned on the frame base 1.

In the use of the apparatus, the filter ribbon is inserted into the machine so that it occupies the position illustrated particularly in Fig. 2 of the drawing, wherein it will be noted that the filter rests in the guide provided by the upper perforate head 31 of the tube 32. The ribbon is securely held in this position by the weight of the lower end of the receptacle 22 pressing thereon. With the ribbon in this position, the cream to be tested is poured into the open upper end of the receptacle. During this operation the pressure cylinder occupies an inactive position about the axis of the pin 5 so that it will be out of the way when cream is poured into the receptacle. Following the filling of the receptacle to the desired level with the cream to be tested, the pressure cylinder is rocked so that it will assume an active position of vertical registry with the open upper end of the cylinder. However, when so registered the biasing spring 21 in said cylinder, through its action on the piston P, elevates the lower head 14 of said piston so that the compressible disk 19 carried thereby assumes a plane above the upper edge of the receptacle 22.

With the parts in vertical registry, as shown in Fig. 2, compressed air or other fluid is admitted into the upper end of the chamber 12 of the cylinder and acts on the upper surfaces of the cups 18 to depress the system against the resistance of the spring 21. This depression or downward movement of the piston causes the disk 19 to have firm sealing engagement with the upper edge of the receptacle. Also, the fluid pressure is used in holding the outlet fitting 24 in firm contact with the filter strip 30. As a result of the restricted passageway 16 in the piston stem 15, a part of the compressed air or other fluid travels through said passageway and into the chamber of the receptacle 22, where it is utilized to apply pressure to the body of cream contained in the receptacle, causing forced travel of the liquid constituents of the cream through the filter strip and thence into the milk can 37 by way of the tube 32 and the perforate head 31 thereof. In this operation, if there are any solids, or other foreign particles in the cream being tested, the fine pores or interstices of the filter strip will cause their retention and deposit on the upper surface of said strip until after the liquid constituents of the cream have passed through the strip. After all the cream has been thus expelled from the receptacle 22, the latter is elevated by manual operation of the stud 28 from its operative association with the head 31. This enables the filter strip to be withdrawn together with any solid materials which may be present thereon as a result of the filtering operation. By simple observation the examinee can then readily determine the grade of the cream and the processing steps to be used in further treatment thereof.

Compressed air, for example, may be then admitted into the upper end of the piston chamber 12 by way of a pipe line 38 which leads from any suitable source of compressed air supply. In the pipe line, there is located a manually operated valve 39 which may, for example, be of the type disclosed specifically in Fig. 6. The valve has been shown as comprising a body 40 formed with a passageway 41 leading to opposite sides of the body 40 and to the threaded pipes 42 which form a part of the pipe line. The passageway 41 is intersected by a valve chamber 43 in which is mounted a slidable spring-pressed valve 44. By the use of the spring 45, which surrounds the actuating stem 46 of the valve, the latter is normally held in an elevated position in which a port 47 therein is out of registry with the passages 41, thereby preventing the flow of compressed air through the valve and associated pipe line into the pressure cylinder. When the valve is normally elevated by the spring 45, a pressure-releasing port 48 therein, leading to the atmosphere, is disposed in communication with the piston chamber 12, bleeding the chamber of compressed air, and allowing the piston P to be forced upwardly through the action of the spring 21. By pressing downwardly on the valve 44, the resistance of the spring 45 may be overcome in bringing the port 47 into registry with the main pipe line to admit compressed air into the pressure cylinder.

In view of the foregoing, it will be evident that the present invention provides a testing machine in which the above-expressed objects and advantages of the invention are achieved. The apparatus is such that it may be readily taken apart and subjected to cleansing or sterilization. Further, the construction of the machine is such that the testing operations performed thereby may be carried out with rapidity and in general with complete reliability in the determinations made thereby.

I claim:

1. Testing apparatus for determining the presence of foreign solids in a liquid medium, comprising: a frame, a liquid-receiving receptacle supported by said frame, said receptacle having a restricted liquid flow-obstructing outlet in the bottom thereof and an open top, means for introducing a liquid-expelling fluid under pressure into the top of said receptacle above a body of liquid contained therein, movable means responsive to said fluid pressure serving to close the open top of the receptacle at the time of introduction of pressure fluid into the receptacle, and filter means stationarily carried by said frame and for removable engagement with the restricted outlet of said receptacle, said receptacle outlet being maintained in liquid-confining engagement with said filter means by pressures applied to the top of the receptacle by said movable means.

2. Testing apparatus for determining the presence of foreign solids in a liquid medium, comprising: a supporting frame, a pressure cylinder having an open bottomed internal chamber, a piston slidable in said chamber, said piston providing upper and lower heads united by a fixed stem through which extends from one end of the piston to the other a restricted pressure fluid-transmitting passageway, biasing means cooperative with said piston for moving the latter in one direction in said cylinder, means for supplying fluid pressure to said cylinder chamber, said means being operative to apply pressure to the piston in overcoming the forces created thereon by said biasing means and moving the piston toward the lower end of said cylinder, an open-topped liquid-holding receptacle carried by said frame, said receptacle having the top thereof arranged for engagement with the lower of said piston heads when said piston is lowered by fluid pressure to overcome the action of the biasing means, restricted outlet means in the bottom of said receptacle, and frame mounted filter means cooperative with the outlet means of said receptacle and against which said outlet means is pressed by said piston, the construction of said filter means being such as to retain thereon foreign solids present in the liquid medium forced by fluid pressure through the filter means.

3. Apparatus for filtering foreign solids from a liquid medium, comprising: a supporting frame, bracket extensions provided at the upper end of said frame, a pressure cylinder secured to said bracket extensions for swinging movement about a substantially vertical axis between active and inactive positions, a piston slidably mounted in said cylinder, said piston including upper and lower heads united by an axial stem through which extends an open-ended fluid-transmitting passageway, a vertical receptacle carried by said frame beneath said cylinder, said receptacle having a restricted outlet in the bottom thereof and an open top, a piston biasing means mounted in said cylinder, valve-controlled means for introducing a fluid under pressure into said cylinder to effect movement of the piston against the action of said biasing means in bringing the lower head of the piston into engagement with the open upper end of said receptacle, and effecting simultaneously the introduction of fluid under pressure into said receptacle through said passageway, and means carried by said frame for supporting a liquid-pervious filter element in registry with the restricted outlet of said receptacle.

4. Testing apparatus of the character described, comprising: a frame, a pressure cylinder, pivotal means joining said cylinder with the upper portion of said frame for swinging movement about a vertical axis between active and inactive positions, an open-topped receptacle for the reception of a liquid to be tested, means carried by said frame for supporting said receptacle in a vertical position, fluid-pressure actuated means operative when said cylinder occupies its active position for clamping fluid-tight engagement with the upper end of said receptacle and introducing simultaneously therein a fluid under pressure, whereby to effect the forced expulsion of a liquid medium contained in the receptacle through an outlet in the lower end of the receptacle, and stationary frame-mounted filter means arranged in registry with said outlet and held in fluid-tight engagement therewith by said pressure-actuated means, said filter means possessing the capacity of removing solids from the liquid medium discharged under pressure from the receptacle and to retain said solids on the filter medium for examination.

5. Testing apparatus of the character set forth, a frame, a pressure cylinder having an open-bottomed internal chamber, means pivotally connecting said cylinder at one side thereof with said frame to provide for turning movement of the cylinder bodily about a substantially vertical axis between active and inactive positions, a piston disposed in the chamber of said cylinder, said piston embodying upper and lower heads united by a fixed axially disposed stem, there being a restricted passageway extending through said heads and stem from one end of said piston to the other, a cylinder carried by said frame for the reception of a measured quantity of a liquid medium, said receptacle including an open upper end and a reduced liquid outlet in the lower end thereof, means communicating with the interior of said cylinder for applying fluid pressure to said piston to force its lower head into sealing engagement with the open upper end of said receptacle when said cylinder occupies its active position of vertical registry with said receptacle and, simultaneously, to transmit said fluid through said passageway to admit of the introduction of the fluid under pressure into said receptacle in producing forced expulsion of a liquid medium from the receptacle through the outlet in the lower end thereof, and a filtering device carried by said frame in registry with the receptacle outlet.

6. Testing apparatus as defined in claim 5, and wherein the apparatus is further characterized by the provision of a biasing spring disposed within the piston chamber of said cylinder and acting upon said piston to move the same in a direction opposed to the movement produced by said piston when responding to the introduction of fluid pressure into said cylinder.

7. Testing apparatus as defined in claim 5, and further characterized by the provision of adjustable means for limiting the swinging movement of the pressure cylinder between active and inactive positions thereof.

8. Testing apparatus for determining the presence of foreign solids in a liquid medium as defined in claim 5, and further characterized by the provision of compressible means on the lower surface of the lower head of said piston, said compressible means having yielding engagement with the open upper edge portions of said receptacle.

9. Apparatus for filtering foreign solids from a liquid medium, comprising: a supporting frame; a pressure cylinder; means uniting said pressure cylinder at one side thereof with said frame for swinging movement about a substantially vertical axis; a piston slidably mounted in a chamber provided in said cylinder, said piston being formed with an open-ended axially disposed fluid-transmitting passageway, the latter passing entirely through the piston from the top to the bottom thereof; a vertical receptacle carried by said frame beneath said cylinder, said receptacle being formed to include a restricted outlet in the bottom thereof and an open top; spring means cooperative with said piston and tending to move the same in a predetermined direction in the chamber of said cylinder; valve-controlled means for introducing a fluid under pressure into said cylinder chamber at the top thereof to effect movement of the piston against the force of said spring means into engagement with the open upper end of said receptacle and the introduction of the fluid under pressure into said receptacle following passage of the fluid through said passageway; and a perforated head supported by said frame beneath the restricted outlet of said receptacle, said head being formed for the reception of a removable filter element through which liquid contained in said receptacle is adapted to be forced so that solids present in said liquid will be entrapped by said filter element.

References Cited in the file of this patent

UNITED STATES PATENTS

| | | |
|---|---|---|
| 1,445,770 | Kendall | Feb. 20, 1923 |
| 1,613,150 | Zore | Jan. 4, 1927 |
| 1,973,674 | Rosenkranz | Sept. 11, 1934 |
| 2,435,578 | Ferraez, Jr. | Feb. 10, 1948 |